United States Patent [19]

Schulz

[11] 4,000,866
[45] Jan. 4, 1977

[54] TAPE REEL DRIVE SYSTEM FOR VIDEO RECORDER/REPRODUCER

[75] Inventor: Gordon Schulz, Villa Park, Calif.
[73] Assignee: Odetics, Inc., Anaheim, Calif.
[22] Filed: Jan. 19, 1976
[21] Appl. No.: 650,456
[52] U.S. Cl. .............................. 242/203; 242/68.2
[51] Int. Cl.² .................... G03B 1/04; G11B 15/32
[58] Field of Search ......................... 242/200–204, 242/72, 68.2, 68.3, 3, 46.6; 360/93–96; 318/6, 7, 212

[56] References Cited
UNITED STATES PATENTS

| | | | |
|---|---|---|---|
| 3,000,582 | 9/1961 | Brede | 242/72 |
| 3,254,287 | 5/1966 | Wolfner | 318/212 |
| 3,561,699 | 2/1971 | Garrett et al. | 242/193 |

*Primary Examiner*—Leonard D. Christian
*Attorney, Agent, or Firm*—Philip M. Hinderstein

[57] ABSTRACT

A dual reel drive system for a video recorder/reproducer comprising first and second identical reel drive assemblies, each of the assemblies including a drive shaft; a motor connected to the drive shaft; a first clamping ring connected to one end of the drive shaft; a push rod mounted coaxially with the drive shaft; a second clamping ring connected to one end of the push rod, adjacent the first clamping ring; an expandable gripping ring mounted between the first and second clamping rings, the gripping ring and the second clamping ring being adapted to extend into a reel for engaging same, movement of the first and second clamping rings towards each other longitudinally compressing and laterally expanding the gripping ring into engagement with a reel mounted thereon; a spring connected between the other ends of the drive shaft and the push rod for applying a force therebetween to maintain the gripping ring in the expanded condition; and an actuating shaft and a cam member for selectably separating the clamping rings to permit relaxation of the gripping ring and release of the reels. In a dual drive system, the actuating cams are mounted on a single actuating shaft for simultaneous operation of the two drive assemblies, the cams being located so as to rotate the push rods as the gripping rings are expanded in directions to increase the tension in the tape extending between the reels to take up any slack existing therein.

10 Claims, 3 Drawing Figures

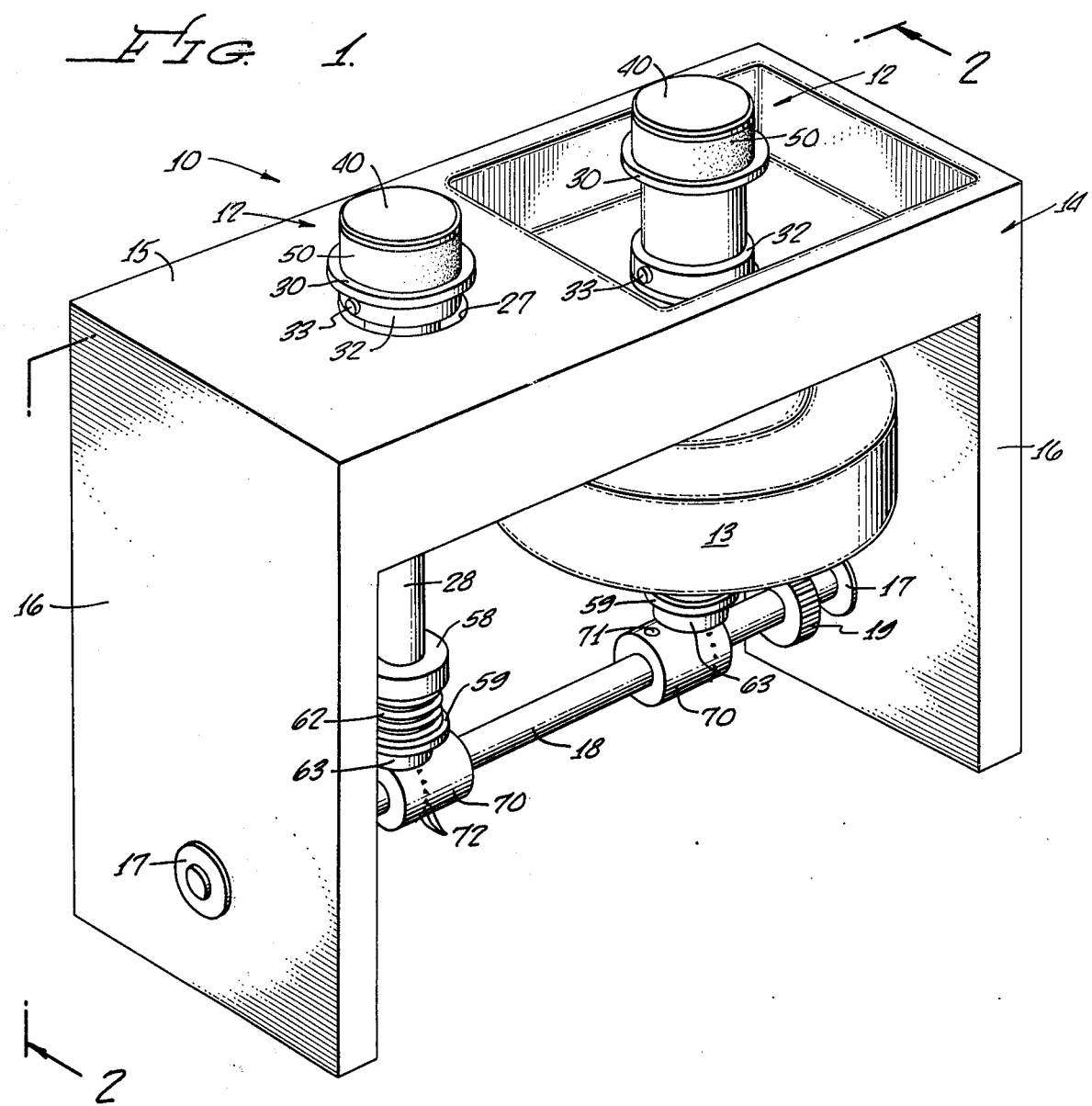

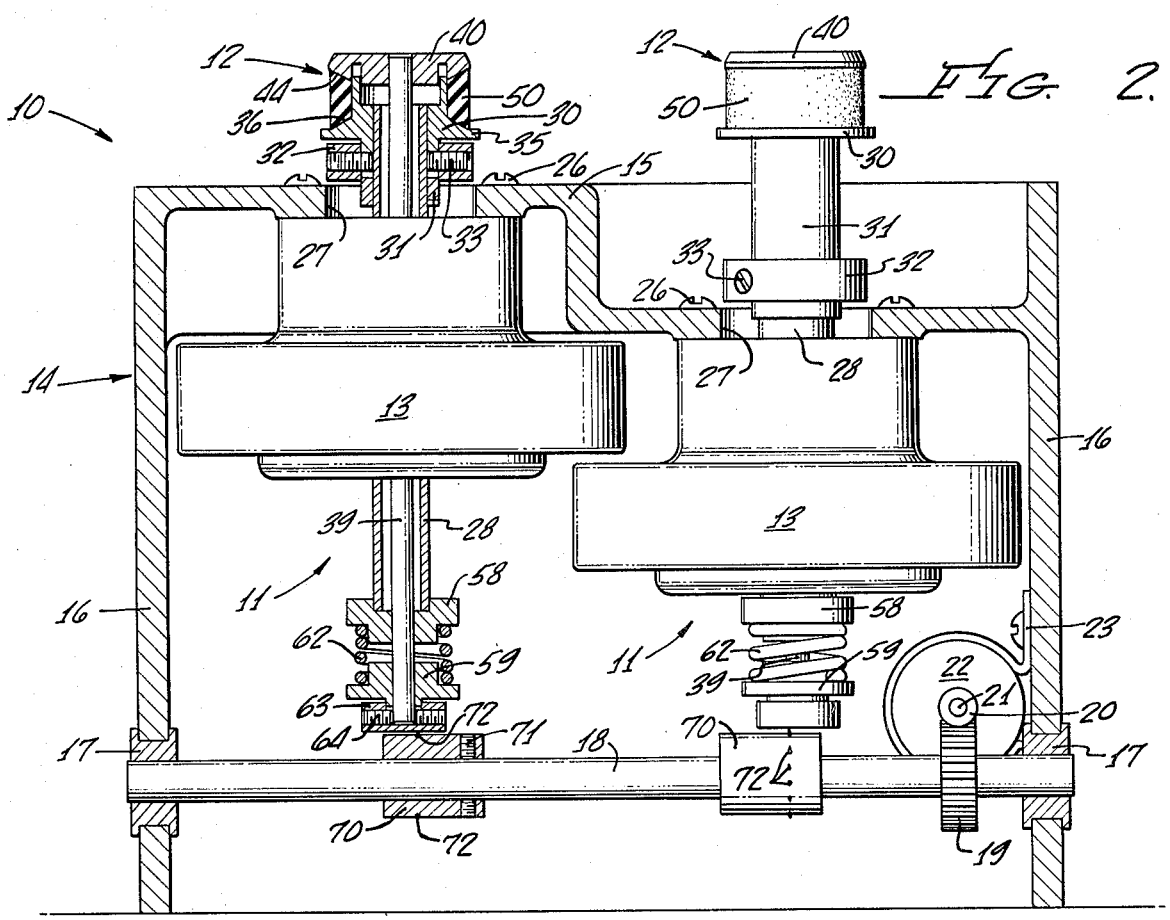
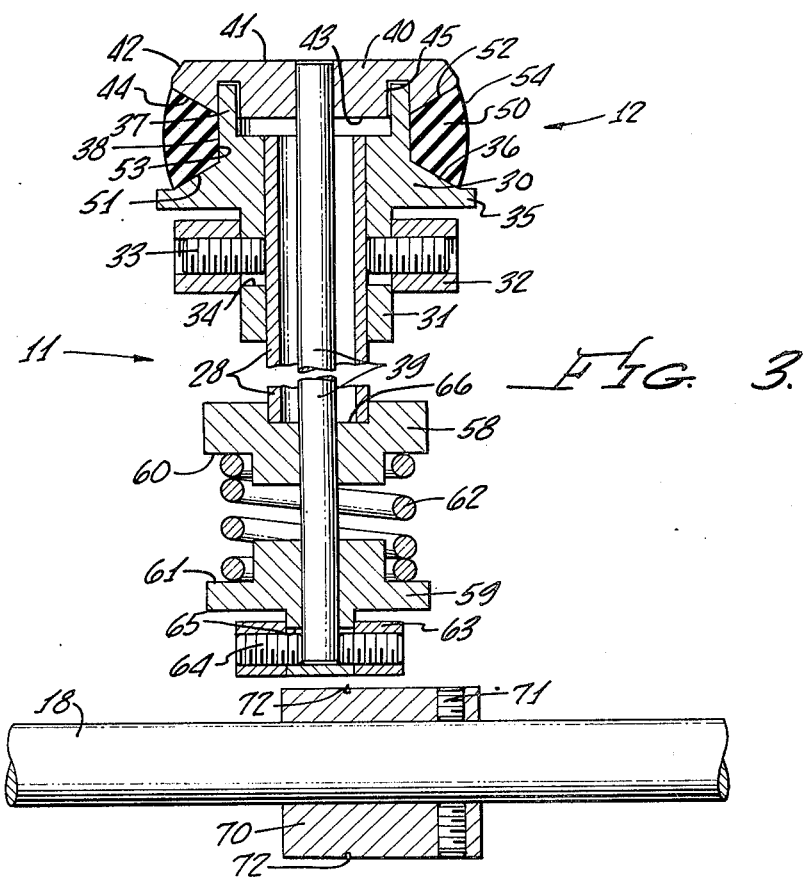

TAPE REEL DRIVE SYSTEM FOR VIDEO RECORDER/REPRODUCER

BACKGROUND OF THE INVENTION

1. Field of the Invention

The present invention relates to a tape reel drive system for a video recorder/reproducer and, more particularly, to a tape reel drive system for positively engaging a pair of tape reels and simultaneously taking up any slack in the tape extending between the reels.

2. Description of the Prior Art

Video recording tape is commonly supplied in a standard type cassette to eliminate the problems associated with open reels and the threading of the tape into a video recorder/reproducer. A variety of video recorder/reproducers have been developed for receiving standard video cassettes.

When using a standard video cassette with a video recorder/reproducer, the first problem becomes that of mating and demating the reels within the cassette to the reel drive system of the recorder/reproducer. For this purpose, a number of different systems have been developed for receiving the video cassette and lowering it onto a pair of reel drive hubs which receive the reels for driving the tape in opposite directions.

The cassette loaders and tape reel drive systems that have been developed heretofore have been intended for use with video recorder/reproducers designed for recording and playing back standard television type signals. In such systems, the tape travels at relatively low speeds, typically 3¾ inches per second during play back and 45 inches per second during rewind. The drive hubs typically have one or more pins which engage corresponding holes in the reels for driving of the reels by the hubs. The reels simply sit on the hubs, with no positive gripping force other than that provided by gravity.

On the other hand, the present tape reel drive system is intended for use with a video recorder/reproducer designed for use in a document acquisition and retrieval system. This environment places a number of constraints on the video tape, the cassette, and the reel drive system which cannot be accommodated with conventional loaders and reel drive systems. For example, the present reel drive system is intended for use in a system where tape travels in two directions, during a search mode, at speeds in excess of 400 inches per second. It is obvious that when tape is run at such speeds, there must be a positive connection between the drive hubs and the tape reels. Still further, when used in a document acquisition and retrieval system, it is desirable that the recorder/reproducer be positionable at any angle, not necessarily horizontal, so that gravity cannot be relied upon to insure contact between the reel drive hubs and the tape reels.

Once a video cassette is loaded into a video recorder/reproducer, a mechanism is typically employed to withdraw the tape from the cassette so that it may be engaged with the video recording and reproducing heads. To prevent jamming of the tape during this withdrawal process, it is important that the tape reels be rotated to eliminate slack in the tape therebetween. If there is any significant amount of slack in the tape between the reels, the tape withdrawal mechanism may not operate properly. Heretofore, it has been necessary to twist the tape reels by hand before loading a cassette into a system in order to take up the slack. However, since operators typically forget to perform this operation, numerous occasions of tape jamming result.

SUMMARY OF THE INVENTION

According to the present invention, there is provided a tape reel drive system for a video recorder/reproducer which virtually eliminates the problems discussed above. According to the present invention, as a video cassette is delivered onto a pair of reel drive hubs, the hubs are activated to positively grip the reels for driving of same in any angular orientation thereof. Furthermore, as the present tape reel drive system engages the tape reels, the hubs are rotated in a direction which operates to increase the tension in the tape extending between the reels so as to take up any slack existing therebetween. The present system operates completely automatically and may be used by relatively untrained operators as part of an accurate and reliable document acquisition and retrieval system.

Briefly, the present tape reel drive system for a video recorder/reproducer comprises first and second identical reel drive assemblies, each of the assemblies including a drive shaft; a motor connected to the drive shaft; a first clamping ring connected to one end of the drive shaft; a push rod mounted coaxially with the drive shaft; a second clamping ring connected to one end of the push rod, adjacent the first clamping ring; an expandable gripping ring mounted between the first and second clamping rings, the gripping ring and the second clamping ring being adapted to extend into a reel for engaging same, movement of the first and second clamping rings towards each other longitudinally compressing and laterally expanding the gripping ring into engagement with a reel mounted thereon; a spring connected between the other ends of the drive shaft and the push rod for applying a force therebetween to maintain the gripping ring in the expanded condition; and an actuating shaft and a cam member for selectably separating the clamping rings to permit relaxation of the gripping ring and release of the reels. In a dual drive system, the actuating cams are mounted on a single actuating shaft for simultaneous operation of the two drive assemblies, the cams being located so as to rotate the push rods as the gripping rings are expanded in directions to increase the tension in the tape extending between the reels to take up any slack existing therein.

OBJECTS

It is therefore an object of the present invention to provide a tape reel drive system for a video recorder/reproducer.

It is a further object of the present invention to provide a tape reel drive system including a pair of hubs which positively engage the tape reels for driving of same.

It is a further object of the present invention to provide a tape reel drive system which automatically engages the tape reels upon loading of the cassette into a video recorder/reproducer.

It is another object of the present invention to provide a tape reel drive system in which tape slack is automatically eliminated.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 1 is a front perspective view of a tape reel drive system for a video recorder/reproducer constructed in accordance with the teachings of the present invention;

FIG. 2 is a sectional view taken along the line 2—2 in FIG. 1 with the drive hubs shown in the unclamped condition; and FIG. 3 is an enlarged, partial sectional view of one of the reel drive assemblies of FIGS. 1 and 2 with the drive hub shown in the clamped condition.

DESCRIPTION OF THE PREFERRED EMBODIMENT

Referring now to the drawings, the present tape reel drive system, generally designated 10, is designed to receive a standard video cassette (not shown) of a type well known to those skilled in the art. Furthermore, drive system 10 may have such a cassette delivered thereto by a cassette loader of the type described in my copending U.S. patent application Ser. No. 650,455, entitled Cassette Loader For Video Recorder/Reproducer, filed concurrently herewith. In such a case, drive system 10 has a number of elements in common with the cassette loader of my copending application, such as a pair of reel drive hubs, generally designated 12, which are connected to and driven by motors 13. The main frame element of the cassette loader of my copending application and drive system 10 is a hat-shaped base member 14 having a central, generally rectangular section 15 which, for purposes of explanation, will be assumed to be positioned in a horizontal plane, as shown. However, it will be apparent to those skilled in the art that drive system 10 may be positioned in any angular orientation and will still operate and perform its intended function.

Extending downwardly in spaced, parallel relationship from the side edges of the bottom of section 15 of base member 14 are a pair of identical side sections 16. Bearings 17 in side sections 16 support for rotation a drive and actuating shaft 18 having a worm wheel 19 mounted thereon for driving same, worm wheel 19 engaging a worm 20 connected to the output shaft 21 of a motor 22. Motor 22 may be connected to one of side sections 16 of base member 14 by a bracket 23. Actuating shaft 18 of reel drive system 10 would correspond to main drive shaft 44 of the cassette loader of my copending application for simultaneous activation of reel drive system 10 and such cassette loader. For a fuller discussion of such cassette loader and the manner in which it delivers a cassette to hubs 12, reference should be had to my copending application.

Hubs 12, there being two in drive system 10, are parts of a pair of reel drive assemblies 11 which, for all practical purposes, are identical so that an explanation of the structure and operation of one will suffice to describe the structure and operation of the other. Furthermore, all references in the singular shall be understood to be plural, where applicable, and vice versa. Each reel drive assembly 11 includes one of the beforementioned motors 13, motors 13 being connected to section 15 of base member 14 by screws 26. Section 15 of base member 14 may be offset, as shown, to accommodate overlapping of motors 13. If this is done, corresponding adjustments must be made in the lengths of the various rotatable elements so that hubs 12 are positioned coplanar to receive the reels of a standard cassette.

As can be seen in FIG. 2, section 15 of base member 14 has a pair of holes 27 therein through which the drive shafts 28 of motors 13 extend so that hubs 12 extend vertically upwardly from the top surface of section 15. Drive shafts 28 would be parallel and spaced by the same distance as the spacing between the axes of a conventional cassette.

Referring primarily to FIG. 3, each drive shaft 28 consists of an elongate sleeve which extends through motor 13 and is driven thereby, one end of sleeve 28 terminating above section 15 of base member 14 and the other end of sleeve 28 terminating beneath motor 13. The axes of sleeves 28 intersect the axis of actuating shaft 18 for reasons which will appear more fully hereinafter.

Connected to the one end of each drive shaft 28 is a stationary clamping ring 30. Clamping ring 30 includes a collar 31 having an inside diameter which is approximately equal to the outside diameter of drive shaft 28, collar 31 being positioned coaxially with shaft 28, with one end of collar 31 aligned with the one end of shaft 28. Collar 31 has a locking ring 32 positioned around the other end thereof, locking ring 32 supporting a plurality of set screws 33 which extend through aligned slots 34 in collar 31 for engagement with drive shaft 28. Thus, set screws 33 and locking ring 32 rigidly connect clamping ring 30 to drive shaft 28.

Clamping ring 30 also includes an intermediate shoulder 35 spaced from the one end of drive shaft 28 and extending radially outwardly from collar 31, the diameter of shoulder 35 being greater than the inside diameter of the reels of a standard cassette so that upon insertion of a reel over one of hubs 12, the lower end of the reel engages shoulder 35. The surface of shoulder 35 facing locking ring 32 is perpendicular to the axis of shaft 28 whereas the opposite surface 36 thereof is tapered at an acute angle relative to a plane perpendicular to drive shaft 28 so as to face generally upwardly and outwardly. The reason for this configuration will appear more fully hereinafter.

Clamping ring 30 also includes a collar 37 having an inside diameter which is approximately equal to the outside diameter of collar 31 and an outside diameter which is substantially less than that of shoulder 35, collar 37 extending coaxially with drive shaft 28, beyond the one end of collar 31. The outer surface 38 of collar 37 is parallel to the axis of drive shaft 28 and merges into tapered surface 36 of shoulder 35. Collar 31, shoulder 35, and collar 37 are preferably made as a single integral member and make up clamping ring 30.

Each reel drive assembly 11 further includes a vertically reciprocal push rod 39 mounted coaxially with and inside of drive shaft 28. Neither push rod 39 is connected to its associated drive shaft 28 so that push rods 39 are free to move longitudinally relative to drive shafts 28. However push rods 39 do rotate with drive shafts 28 for reasons which will appear more fully hereinafter. For the time being it should be noted that each push rod 39 is longer than its associated drive shaft 28, one end of each push rod 39 extending beyond the one end of the associated drive shaft 28 and the other end of each push rod 39 extending beyond the other end of the associated drive shaft 28.

Each reel drive assembly 11 further includes a movable clamping ring 40 connected to the one end of its associated push rod 39, adjacent to but spaced from clamping ring 30. Each clamping ring 40 is a generally disc-shaped member which is rigidly connected to the one end of push rod 39 for movement therewith. The upwardly facing surface 41 of each clamping ring 40 is generally perpendicular to push rod 39 and terminates in a downwardly tapering surface 42 which serves as a guide to direct the reel of a video cassette thereover. The downwardly facing surface 43 of each clamping ring 40 is generally perpendicular to push rod 39 and terminates in an upwardly tapering surface 44 which faces downwardly and outwardly and is positioned to provide an essentially mirror image of tapered surface 36 of clamping ring 30. Furthermore, clamping ring 40 has a longitudinal, cylindrical groove 45 therein, groove 45 being aligned with collar 37 of clamping ring 30 for receipt of same, collar 37 and groove 45 cooperating to provide a guide for the longitudinal movement of clamping ring 40 relative to clamping ring 30.

Each reel drive assembly 11 also includes an expandable reel gripping ring 50 mounted between clamping rings 30 and 40, gripping ring 50 being adapted to extend into a reel positioned over hub 12 for engaging same. Gripping ring 50 is made from an elastomeric material and normally has a trapezoidal cross-section, as shown in FIG. 2. Gripping ring 50 is positioned over clamping ring 30 with the angled surfaces 51 and 52 thereof engaging tapered surfaces 36 and 44, respectively, of clamping rings 30 and 40, respectively, with the shorter parallel surface 53 of ring 50 engaging surface 38 of collar 37, and with the longer parallel surface 54 of ring 50 facing outwardly, generally parallel to the common axis of shaft 28 and push rod 39 and essentially coplanar with outer surface of clamping ring 40. It can be seen by an examination and comparison of FIGS. 2 and 3 that with clamping rings 30 and 40 separated, as shown in FIG. 2, gripping ring 50 is in its relaxed, unclamped condition with surface 54 thereof parallel to surface 53 thereof. On the other hand, movement of clamping ring 40 toward clamping ring 30, as shown in FIG. 3, drives surface 52 of gripping ring 50 towards surface 51 thereof, longitudinally compressing ring 50 and expanding surface 54 thereof outwardly into engagement with a reel mounted thereon.

A force is normally applied between drive shafts 28 and push rods 39 to maintain gripping rings 50 in the expanded, clamped condition, as shown in FIG. 3. More particularly, each reel drive assembly 11 includes first and second spaced, parallel discs 58 and 59 connected to the other ends of drive shaft 28 and push rod 39, respectively. Discs 58 and 59 have facing shoulders 60 and 61, respectively, which support the opposite ends of a clamping spring 62 which operates to separate discs 58 and 59, moving the other end of push rod 39 away from the other end of drive shaft 28 and moving the one end of push rod 39 towards the one end of drive shaft 28. The force of spring 62 is sufficient to maintain gripping ring 50 in the expanded, clamped condition shown in FIG. 3.

Disc 59 may be connected to the other end of push rod 39 by means of a locking ring 63 which surrounds a portion of disc 59 and supports a plurality of set screws 64 which extend through aligned slots 65 in ring 59. Thus, set screws 64 lock ring 59 to push rod 39. Connection of disc 58 to drive shaft 28 may be achieved simply by providing a shoulder 66 in the side of disc 58 opposite shoulder 60, shoulder 66 receiving the other end of drive shaft 28. Furthermore, spring 62 will maintain disc 58 in contact with drive shaft 28.

It should be particularly noted from an inspection of FIG. 3 that reel drive assembly 11 is in its reel clamping mode without any external force being applied to drive shaft 28 or push rod 39 which would inhibit the rotation thereof during the operation of drive system 10. Thus, motors 13 are free to drive shafts 28, all the remaining elements of assemblies 11 rotating with drive shafts 28 due to the engagement therebetween. On the other hand, it is only necessary to contact assemblies 11 at such time as it is necessary to separate clamping rings 30 and 40 to permit relaxation of gripping rings 50 and release of reels mounted thereon.

More particularly, and as shown in FIGS. 2 and 3, actuating shaft 18 is positioned perpendicular to drive shafts 28 and push rods 39 with the axis of shaft 18 intersecting the axes of both assemblies 11. First and second eccentric cam members 70 are mounted on shaft 18, directly beneath discs 59, cam members 70 being connected to shaft 18 by one or more set screws 71. In a first position of actuating shaft 18, shown in FIG. 3, cam members 70 are spaced from and out of contact with discs 59 of assemblies 11, permitting compression of gripping rings 50 by clamping springs 62. The downward movement of push rod 39 is limited, in this position, by gripping ring 50 which has only a limited degree of compressibility. Thus, in this condition, there is no contact and no tendency for contact between cam members 70 and discs 59.

On the other hand, in a second position of actuating shaft 18, a position which is reached upon rotation of shaft 18 through an angle of 180°, cam members 70 contact discs 59 of both assemblies 11 and force discs 59 towards discs 58, compressing springs 62 and separating clamping rings 30 and 40 to permit relaxation of gripping rings 50. As long as cam members 70 maintain push rods 39 and clamping rings 30 and 40 in this position, a reel may be readily inserted onto and removed from hubs 12 of assemblies 11.

In my beforementioned copending application for a cassette loader for a video recorder/reproducer, shaft 18 rotates through an angle of 360° during the cassette loading sequence. This is also the case with tape reel drive system 10. That is, motor 22 would normally position shaft 18 so that cam members 70 are spaced from discs 59 and gripping rings 50 are in the clamped condition. During the loading sequence, motor 22 first drives shaft 18 through an angle of 180° to cause elevation of push rods 39 and relaxation of gripping rings 50. During the same 180° of rotation of shaft 18, the cassette loader of my copending application is lowering a cassette onto hubs 12 of assemblies 11 which are now capable of receiving the reels due to the relaxed condition of gripping rings 50. During the second 180° of rotation of shaft 18, where the cassette loader of my copending application is clamping the cassette down on assemblies 11, cam members 70 are releasing push rods 39 so that gripping rings 50 expand and grip the reels. Accordingly, upon reaching the 360° position of shaft 18, the cassette is clamped on reel drive system 10 and hubs 12 are clamped to cassette reels, cam members 70 are spaced from discs 59, and motors 13 are free to drive the reels to wind the tape connected therebetween from one of the reels to the other thereof.

According to the present invention, simultaneously with the gripping of the cassette reels, drive assemblies 11 are rotated in directions to increase the tension in the tape extending between the reels so as to take up any slack which may exist in the tape. That is, and referring primarily to FIG. 3, each cam member 70 preferably includes a plurality of needle bearings 72 which extend outwardly therefrom, needle bearings 72 being coplanar and perpendicular to the axis of shaft 18. The significant thing to note is that the plane of each set of needle bearings 72 is offset to one side or the other of the longitudinal axis of the associated push rod 39 and disc 59. Thus, as cam members 70 rotate, needle bearings 72 are brought into contact with the lower ends of discs 59, but along tangent lines which are spaced from the axis of rotation of discs 59. Accordingly, as needle bearings 72 rotate with cam members 70, a torque is applied to discs 59 which is transmitted to push rods 39 to rotate assemblies 11, including drive shafts 28 and all parts connected between drive shafts 28 and push rods 39. It is obvious that the amount of this torque can be adjusted by adjusting the spacing between needle bearings 72 and the axes of push rods 39 and that the direction of the torque may be adjusted by positioning needle bearings 72 to one side or the other of the axis of push rods 39. Thus, this technique may be utilized to rotate assemblies 11 in whatever directions are required to increase the tension in the tape extending between the reels mounted on hubs 12 thereof to take up any slack that may exist. When all slack has been taken up, needle bearings 72 will simply slide on the ends of discs 59.

It can therefore be seen that according to the present invention, there is provided a tape reel drive system 10 for a video recorder/reproducer which virtually eliminates the problems discussed hereinabove. According to the present invention, as a video cassette is delivered onto hubs 12 of assemblies 11, gripping rings 50 are activated to positively grip the reels for driving of same in any angular orientation thereof. Furthermore, as system 10 engages the tape reels, hubs 12 are rotated in a direction which operates to increase the tension in the tape extending between the reels so as to take up any slack existing therein. System 10 operates completely automatically and may be used by relatively untrained operators as part of an accurate and reliable document acquistion and retrieval system.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:
1. A positive gripping reel drive assembly comprising:
   a drive shaft;
   a motor connected to said drive shaft;
   a first clamping ring connected to one end of said drive shaft;
   a push rod mounted coaxially with said drive shaft;
   a second clamping ring connected to one end of said push rod, adjacent said first clamping ring;
   an expandable reel gripping ring mounted between said first and second clamping rings, said gripping ring being adapted to extend into a reel for engaging same, movement of said first and second clamping rings toward each other longitudinally compressing and laterally expanding said gripping ring into engagement with a reel mounted thereon;
   means connected between said drive shaft and said push rod for applying a force therebetween to maintain said gripping ring in said expanded condition; and
   means for selectibly separating said clamping rings to permit relaxation of said gripping ring and release of said reel.

2. A reel drive assembly according to claim 1 wherein said drive shaft comprises:
   a sleeve surrounding said push rod, coaxial therewith.

3. A reel drive assembly according to claim 2 wherein said first clamping ring comprises:
   a shoulder spaced from said one end of said drive shaft and extending radially outwardly therefrom, said reel engaging said shoulder upon insertion of said gripping ring into said reel; and
   a tapered surface extending inwardly towards said one end of said drive shaft and facing outwardly towards said gripping ring for engagement therewith.

4. A reel drive assembly according to claim 3 wherein said second clamping ring comprises:
   a disc-shaped member connected to said one end of said push rod and extending radially outwardly therefrom, the diameter of said disc-shaped member being less than the inner diameter of said reel to permit extension of said member into said reel with said gripping ring; and
   a tapered surface extending inwardly towards tapered surface of said first clamp ring and facing outwardly towards said gripping ring for engagement therewith.

5. A reel drive assembly according to claim 4 wherein said gripping ring has a trapezoidal cross-section, the angled surfaces thereof engaging said tapered surfaces of said first and second clamping rings, the outwardly facing surface of said gripping ring being parallel to the inwardly facing surface thereof and parallel to the common axis of said drive shaft and said push rod when said gripping ring is in said relaxed condition, movement of said first and second clamping rings towards each other causing longitudinally compression of said gripping ring and outward expansion of said outwardly facing surface thereof into engagement with a reel mounted thereon.

6. A reel drive assembly according to claim 5 wherein said force applying means comprises:
   a first disc connected to the other end of said drive shaft;
   a second disc connected to the other end of said push rod; and
   a spring connected between said first and second discs for separating said discs and moving said one end of said push rod toward said one end of said drive shaft.

7. A reel drive assembly according to claim 6 wherein said clamping rings separating means comprises:
   an actuating shaft positioned perpendicular to said drive shaft and said push rod, the axis of said actuating shaft intersecting said common axis of said drive shaft and said push rod; and
   a cam member mounted on said actuating shaft, said cam member, in a first position of said actuating shaft, being out of contact with said second disc permitting compression of said gripping ring, said cam member, in a second position of said actuating shaft, contacting said second disc and forcing said second disc towards said first disc, compressing said spring and separating said first and second clamping rings to permit relaxation of said gripping ring and release of said reel.

8. A dual reel drive system comprising:
first and second reel drive assemblies according to claim 6, the drive shafts of said first and second assemblies being mounted in parallel, spaced relationship with said clamping rings coplanar to receive a pair of reels for engaging said reels and driving said reels to wind tape connected therebetween from one of said reels to the other thereof.

9. A dual reel drive system according to claim 8 wherein said clamping rings separating means of said first and second reel drive assemblies comprise:
a single actuating shaft positioned perpendicular to said drive shafts and said push rods of said first and second assemblies, the axis of said actuating shaft intersecting the common axes of said drive shaft and said push rod of said first and second assemblies; and first and second cam members mounted on said actuating shaft, said cam members, in a first position of said actuating shaft, being out of contact with said second discs of said assemblies permitting compression of said gripping rings, said first and second cam members, in a second position of said actuating shaft, contacting said second discs of said first and second assemblies, respectively, and forcing said second discs towards said first discs, compressing said springs and separating said first and second clamping rings of said first and second assemblies to permit relaxation of said gripping rings of said assemblies and release of said reels.

10. A dual reel drive system according to claim 9 wherein said first and second cams are positioned relative to the axes of said push rods so as to cause rotation of said second discs and said push rods as said cam members rotate in contact with said second discs between said first and second positions of said actuating shaft, said cams causing rotation of said push rods in directions to increase the tension in said tape extending between said reels.

* * * * *